United States Patent [19]
Komiya et al.

[11] Patent Number: 5,840,826
[45] Date of Patent: Nov. 24, 1998

[54] PROCESS FOR PREPARING AROMATIC POLYCARBONATE

[75] Inventors: Kyosuke Komiya; Shinsuke Fukuoka, both of Kurashiki; Mamoru Kawamura, Oomiya, all of Japan

[73] Assignee: Asahi Kasei Kogyo Kabushiki Kaisha, Osaka, Japan

[21] Appl. No.: 913,781

[22] PCT Filed: Dec. 13, 1996

[86] PCT No.: PCT/JP96/03658

§ 371 Date: Sep. 19, 1997

§ 102(e) Date: Sep. 19, 1997

[87] PCT Pub. No.: WO97/22650

PCT Pub. Date: Jun. 26, 1997

[30] Foreign Application Priority Data

Dec. 15, 1995 [JP] Japan .................................. 7-327369

[51] Int. Cl.$^6$ .................................................. C08G 64/00
[52] U.S. Cl. .................................................. 528/196
[58] Field of Search .............................................. 528/196

[56] References Cited

U.S. PATENT DOCUMENTS

| 3,888,826 | 6/1975 | Yamana et al. | 528/196 |
| 5,596,067 | 1/1997 | Komiya et al. | 528/196 |

FOREIGN PATENT DOCUMENTS

| 5-019600 | 7/1975 | Japan . |
| 2-153923A | 6/1990 | Japan . |

*Primary Examiner*—Terressa Mosley
*Attorney, Agent, or Firm*—Birch, Stewart, Kolasch and Birch, LLP

[57] ABSTRACT

Disclosed is a method for producing an aromatic polycarbonate which comprises subjecting to a transesterification reaction in a polymerizer at least one polymerizable material selected from a molten monomer mixture of an aromatic dihydroxy compound and a diaryl carbonate, and a molten prepolymer obtained from the monomer mixture, wherein a liquid mass of polymerizable material being transesterified in the polymerizer has an exposed surface, and wherein the transesterification reaction of the liquid mass of polymerizable material is performed under reaction conditions such that the following formula (1) is satisfied:

$$\log(S/V) \geq 2 \times 10^{-5} \times \overline{M}n + 0.8 \qquad (1)$$

wherein S represents an evaporation surface area (m$^2$) which is defined as the area (m$^2$) of the exposed surface of the liquid mass of polymerizable material; V represents the volume (m$^3$) of the liquid mass of polymerizable material in the polymerizer; and $\overline{M}$n represents the number average molecular weight of the aromatic polycarbonate to be produced.

5 Claims, 5 Drawing Sheets

FIG.3 (a)
FIG.3 (b)
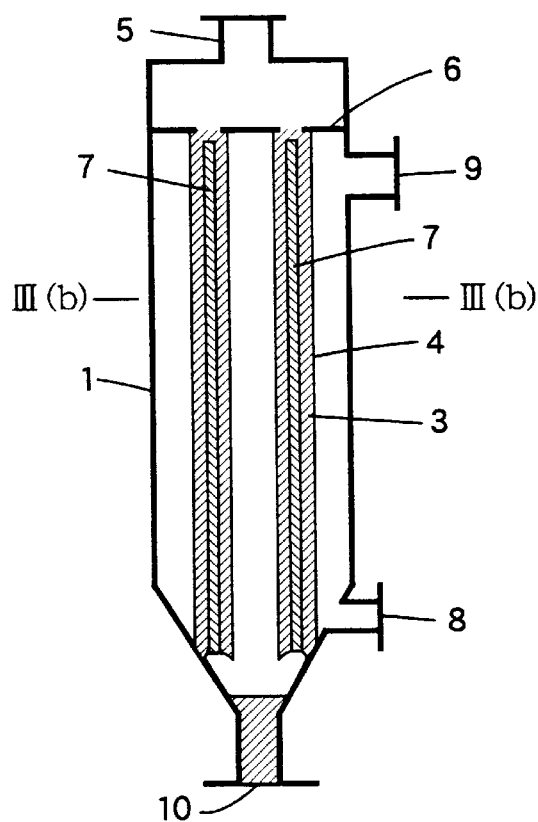
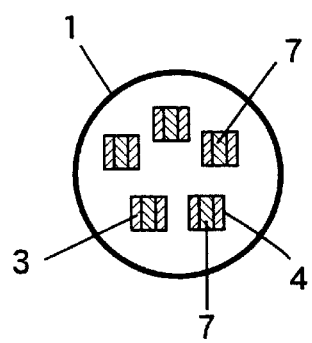
FIG.4 (a)
FIG.4 (b)
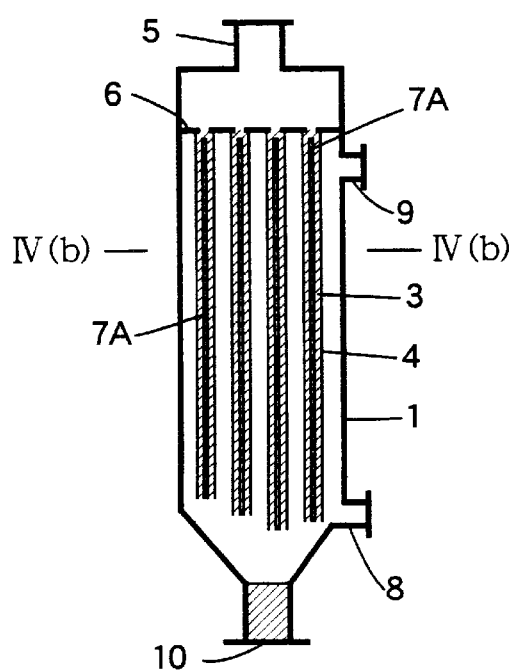
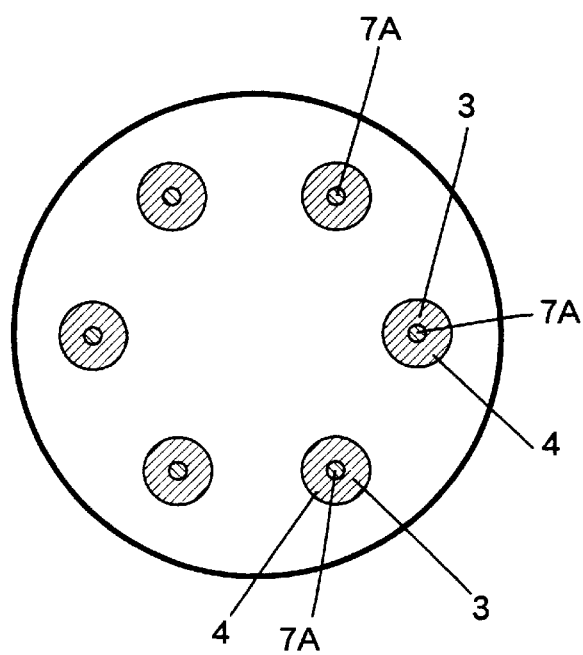

PROCESS FOR PREPARING AROMATIC POLYCARBONATE

BACKGROUND OF THE INVENTION

1. Field of The Invention

The present invention relates to a method for producing an aromatic polycarbonate. More particularly, the present invention is concerned with a method for producing an aromatic polycarbonate, comprising subjecting to a transesterification reaction in a polymerizer at least one polymerizable material selected from the group consisting of a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, and wherein the transesterification reaction of the liquid mass of polymerizable material is performed under reaction conditions such that an evaporation surface area $S$ (m$^2$) which is defined as the area (m$^2$) of the exposed surface of the liquid mass of polymerizable material, the volume $V$ (m$^3$) of the liquid mass of polymerizable material in the polymerizer, and the number average molecular weight $\overline{M}n$ of the aromatic polycarbonate to be produced satisfy specific relationships. According to the method of the present invention, not only can a high quality aromatic polycarbonate having high heat resistance be obtained at high polymerization rate without suffering problems (such as discoloration, entry of impurities and generation of a thermal decomposition product) which are likely to be encountered in the production by a conventional method, but also a very large motive power for agitation is not needed and a scale-up of the polycarbonate production is easy. Therefore, the method of the present invention is commercially advantageous.

2. Prior Art

In recent years, aromatic polycarbonates have been widely used in various fields as engineering plastics having excellent heat resistance, impact resistance and transparency. With respect to methods for producing aromatic polycarbonates, various studies have heretofore been made. Of the methods studied, a process utilizing an interfacial polycondensation between an aromatic dihydroxy compound, such as 2,2-bis(4-hydroxyphenyl)propane (hereinafter, frequently referred to as "bisphenol A"), and phosgene has been commercially practiced.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities, such as sodium chloride, and residual methylene chloride, which adversely affect properties of a produced polymer.

With respect to a method for producing an aromatic polycarbonate from an aromatic dihydroxy compound and a diaryl carbonate, in a conventionally known transesterification process, a polycarbonate is produced by performing an ester exchange reaction between bisphenol A and diphenyl carbonate in the molten state, while removing a by-produced phenolic compound (phenol). Unlike the interfacial polycondensation process, the transesterification process has an advantage in that a solvent need not be used. However, the transesterification process has a serious problem, namely; since the viscosity of polymer being formed increases during the progress of the polymerization reaction, it becomes difficult to remove by-produced phenol from the polymerization reaction system efficiently, thus making it difficult to achieve a high degree of polymerization with respect to polycarbonate produced.

Various polymerizers have been known for use in producing aromatic polycarbonates by the transesterification process. A vertical agitation type polymerizer vessel equipped with an agitator is widely used. The vertical agitation type polymerizer vessel equipped with an agitator is advantageous in that it exhibits high volumetric efficiency and has a simple construction, so that polymerization on a small scale can be efficiently carried out. However, the vertical agitation type polymerizer vessel has a problem in that, as mentioned above, the by-produced phenol becomes difficult to remove from the polymerization reaction system efficiently in the production of aromatic polycarbonates on a commercial scale, so that the polymerization rate becomes extremely low.

Specifically, a large-scale vertical agitation type polymerizer vessel generally has a greater ratio of liquid volume to vaporization area than a small-scale one. In other words, the depth of a reaction mixture in the polymerizer is large and, hence, the pressure in the lower part of the agitation vessel is large. In such a case, even if the degree of vacuum of the polymerization reaction zone is raised in order to achieve a high degree of polymerization in the lower part of the agitation vessel, the polymerization proceeds under virtually high pressure due to the weight of the reaction mixture, so that phenol and the like cannot be efficiently removed.

To solve the above-mentioned problem, various attempts have been made to remove phenol and the like from high viscosity polymer being formed. For example, Examined Japanese Patent Application Publication No. 50-19600 (corresponding to GB-1007302) discloses the use of a screw type polymerizer having a vent. Examined Japanese Patent Application Publication No. 52-36159 discloses the use of an intermeshing twin-screw extruder. Examined Japanese Patent Application Publication No. 53-5718 (corresponding to U.S. Pat. No. 3,888,826) describes a thin film evaporation type reactor, such as a screw evaporator and a centrifugal film evaporator. Further, Unexamined Japanese Patent Application Laid-Open Specification No. 2-153923 discloses a method in which a combination of a thin film evaporation type apparatus and a horizontal agitation type polymerizer vessel is used.

Of these polymerizers, horizontal polymerizers, such as a screw evaporator and a horizontal agitation type polymerizer vessel, are intended to increase, by rotary agitation, the surface renewal of polymer (being formed) to a level as high as possible in an attempt to remove phenol and the like efficiently. For example, Examined Japanese Patent Application Publication No. 50-19600 describes that "A relatively large, continuously renewing interface is formed between the liquid reaction system and the ambient gas or vapor, so that a volatile reaction product formed in the liquid reaction system is extremely smoothly removed." (see page 1, right-hand column, lines 19 to 22 of the above patent document). That is, the above patent document suggests that phenol and the like can be efficiently removed by the renewal of gas-liquid interface. Further, in Examined Japanese Patent Application Publication No. 52-36159,surface renewal effect is defined as a function of the screw revolution rate, the screw surface area in the reaction zone, the total screw pitch number in the reaction zone, the feed amount of raw material and the effective volume per screw pitch in the reaction zone, and it is described that it is important that the value of the surface renewal effect be in a specific range. However, these horizontal polymerizers need rotary agitation force provided by, for example, a screw or an agitator, for increasing the surface renewal. It should be noted that the viscosity of an aromatic polycarbonate being formed extremely increases in accordance with the increase in the molecular weight thereof during the polymerization reaction, so that an extremely large agitation force becomes necessary. In addition, when a large agitation force is exerted on a polymer having a high viscosity, the polymer sustains a large shearing force and, hence, a breakage of the molecular chain occurs, so that the increasing rate of the molecular weight becomes low, making it impossible to obtain an aromatic polycarbonate having a high molecular weight. Further, when an aromatic polycarbonate sustains a large shearing force, a discoloration of the polycarbonate and a lowering of the heat resistance thereof occur, so that the quality of the aromatic polycarbonate is seriously adversely affected. Furthermore, when the production of an aromatic polycarbonate by using an agitation type polymerizer is performed on a commercial scale, the size of the agitation type polymerizer is inevitably limited. This is because when an increase in the size of the agitation type polymerizer is intended, it is necessarily required to increase the strength of the agitator and the motive power for agitation; however, it is limited to increase such strength and motive power. Therefore, with the use of an agitation type polymerizer, the production amount of the aromatic polycarbonate cannot be easily increased. That is, agitation type polymerizers have also a problem in that a scale-up of the production of an aromatic polycarbonate is difficult.

With respect to centrifugal film evaporators, Unexamined Japanese Patent Application Laid-Open Specification No. 2-153923 has a description to the effect that, by using a centrifugal film evaporator as a polycondensation reactor in the final stage of a transesterification reaction, the evaporation surface area of the liquid reaction system per unit weight of the liquid reaction system can be increased, thereby enabling a decrease in the residence time of the liquid reaction system in the reactor. However, the above patent document also points out the following problems. That is, when a centrifugal film evaporator is used, a part of the polymer being formed sticks to the surfaces of a driving shaft, a blade, a bearing for the driving shaft, and the like, and is exposed to a thermal experience for a long period of time, so that the sticking part of the polymer is decomposed to form a black decomposition product, and the black decomposition product undesirably enters the polymer being produced. In order to obviate this problem, the above patent document discloses a method in which a centrifugal film evaporator is used in the middle stage of the transesterification reaction, but not in the final stage of the reaction. However, in this method, a film of polymer is formed only on the inner wall surface of the evaporator and, hence, the volumetric efficiency of the evaporator as a polymerizer is extremely low, so that a satisfactory reaction time cannot be obtained without using a reactor which is too large. Thus, the centrifugal film evaporator cannot be suitably used on a commercial scale.

As described hereinabove, in the production of an aromatic polycarbonate by the transesterification process (which is free from the problem that impurities and residual methylene chloride are contained in the produced polycarbonate and these unfavorable substances cannot be completely removed therefrom), when the transesterification process is performed by the conventional production methods using a vertical agitation type polymerizer, a horizontal agitation type polymerizer, a centrifugal film evaporator, or the like, various problems arise such that phenol cannot be removed efficiently, that a very large motive power for agitation is needed, that the molecular chain of a polymer being formed is broken by the shearing force due to the very large motive power for agitation, resulting in a lowering of the increasing rate of the molecular weight and in a discoloration of the polymer, that a thermal decomposition product of a polymer is generated due to a long-term thermal experience, and the thermal decomposition product undesirably enters the polymer being produced, that the volumetric efficiency of a polymerizer is extremely low, and that a scale-up of the production of an aromatic polycarbonate is difficult.

It has been desired to develop a new method for producing an aromatic polycarbonate, which method solves all of the problems of the prior art simultaneously, namely, to develop a method which is commercially advantageous not only in that a high quality aromatic polycarbonate having high heat resistance can be obtained at high polymerization rate without suffering serious problems (such as discoloration, entry of impurities and generation of a thermal decomposition product) which are likely to be encountered in the production by a conventional method, but also in that a very large motive power for agitation is not needed and a scale-up of the polycarbonate production can be easily achieved.

SUMMARY OF THE INVENTION

In these situations, for solving the above-mentioned problems of the prior art, the present inventors made extensive and intensive studies. As a result, they have unexpectedly found that, in a method for producing an aromatic polycarbonate which comprises subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, the above-mentioned serious problems can be obviated by performing the transesterification reaction of the liquid mass of polymerizable material under reaction conditions such that the following formula (1) is satisfied:

$$\log (S/V) \geq 2 \times 10^{-5} \times \overline{M}n + 0.8 \tag{1}$$

wherein:

S represents an evaporation surface area ($m^2$) which is defined as the area ($m^2$) of the exposed surface of the liquid mass of polymerizable material;

V represents the volume ($m^3$) of the liquid mass of polymerizable material in the polymerizer; and $\overline{M}n$ represents the number average molecular weight of the aromatic polycarbonate to be produced.

Based on this novel finding, the present invention has been completed.

Accordingly, it is a primary object of the present invention to provide a method for producing an aromatic polycarbonate, which method solves all of the problems of the prior art simultaneously, and which is commercially advantageous not only in that a high quality aromatic polycarbonate having high heat resistance can be obtained at high polymerization rate without suffering discoloration, entry of impurities and generation of a thermal decomposition product, but also in that a very large motive power for agitation is not needed and a scale-up of the polycarbonate production can be easily achieved.

The foregoing and other objects, features and advantages of the present invention will be apparent from the following detailed description and appended claims taken in connection with the accompanying drawings.

BRIEF DESCRIPTION OF THE DRAWINGS

In the drawings:

FIG. 2(a) is a diagrammatic view of another mode of the polymerization method of the present invention, explaining the evaporation area S (m$^2$) which is one of the requirements used for defining the present invention;

FIG. 2(b-2) is another diagrammatic view showing how to define the evaporation area S (m$^2$) in the mode of FIG. 2(a), as viewed from above the polymerizer shown in FIG. 2(b-1);

FIG. 3(a) is a diagrammatic cross-sectional view of one form of polymerizer usable in the method of the present invention;

FIG. 3(b) is a diagrammatic cross-sectional view of the polymerizer of FIG. 3(a), taken along the line III(b)—III(b);

FIG. 4(a) is a diagrammatic cross-sectional view of another form of polymerizer usable in the method of the present invention;

FIG. 4(b) is an enlarged diagrammatic cross-sectional view of the polymerizer of FIG. 4(a), taken along the line IV(b)—IV(b);

DESCRIPTION OF REFERENCE NUMERALS

Figure 1:
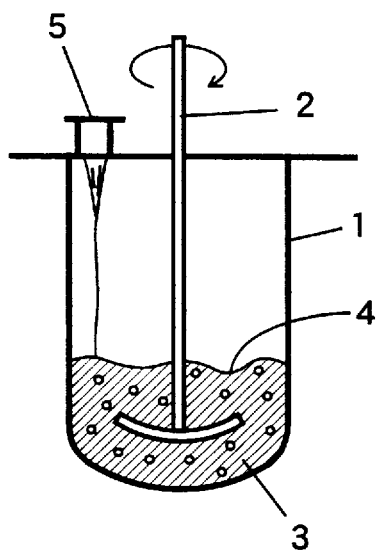
FIG. 1(a) is a diagrammatic view of one mode of the polymerization method of the present invention, explaining the evaporation area S (m$^2$) which is one of the requirements used for defining the present invention.
FIG. 1(b) is a diagrammatic view showing how to define the evaporation area S (m$^2$) in the mode of FIG. 1(a)
Figure 1:
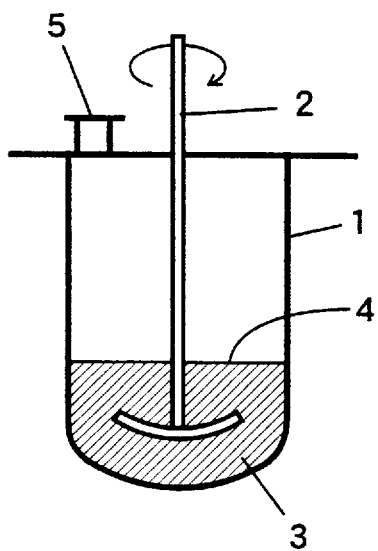

1 Polymerizer
2 Agitator
3 Polymerizing material
4 Horizontal liquid surface (evaporation surface) or flowing liquid surface (evaporation surface)
5 Inlet for a polymerizable material
6 Distributing plate
7 Plate-shaped guide
7A Column-shaped guide
7B Cone-shaped guide
7C Cylindrical tubular guide
8 Gas feed port
9 Vent
10 Outlet
11 Shell chamber (space to be filled by Heating medium)
12 Heating medium feed port
13 Heating medium outlet port

DETAILED DESCRIPTION OF THE INVENTION

According to the present invention, there is provided a method for producing an aromatic polycarbonate, comprising subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, and wherein the transesterification reaction of the liquid mass of polymerizable material is performed under reaction conditions such that the following formula (1) is satisfied:

$$\log (S/V) \geq 2 \times 10^{-5} \times \overline{M}n + 0.8 \tag{1}$$

wherein:

S represents an evaporation surface area (m$^2$) which is defined as the area (m$^2$) of the exposed surface of the liquid mass of polymerizable material;

V represents the volume (m$^3$) of the liquid mass of polymerizable material in the polymerizer; and $\overline{M}n$ represents the number average molecular weight of the aromatic polycarbonate to be produced.

For an easy understanding of the present invention, the essential features and various preferred embodiments of the present invention are enumerated below.

1. In a method for producing an aromatic polycarbonate which comprises subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein the polymerizable material is present in the form of a liquid mass in the polymerizer and wherein the liquid mass of polymerizable material being transesterified in the polymerizer has an exposed surface, the improvement in which the transesterification reaction of the liquid mass of polymerizable material is performed under reaction conditions such that the following formula (1) is satisfied:

$$\log (S/V) \geq 2 \times 10^{-5} \times \overline{M}n + 0.8 \tag{1}$$

wherein:
S represents an evaporation surface area (m²) which is defined as the area (m²) of the exposed surface of the liquid mass of polymerizable material;
V represents the volume (m³) of the liquid mass of polymerizable material in the polymerizer; and
$\overline{M}n$ represents the number average molecular weight of the aromatic polycarbonate to be produced.

2. The method according to item 1 above, wherein the transesterification reaction of the liquid mass of polymerizable material is performed in a wetting fall mode such that the liquid mass of polymerizable material is caused to fall along and in contact with a surface of a solid object selected from the group consisting of an inner wall of the polymerizer and a guide provided in the polymerizer.

3. The method according to item 1 or 2 above, wherein the volume v (m³) of the liquid mass of polymerizable material is 5% or more, based on the internal volume of the polymerizer.

4. The method according to any one of items 1 to 3 above, wherein the evaporation surface area S (m²) of the liquid mass of polymerizable material satisfies the following formula (2):

$$S \geq 0.03Q \quad (2)$$

wherein Q represents the rate (kg/hr) at which the aromatic polycarbonate is produced.

5. The method according to item 4 above, wherein the rate Q (kg/hr) at which the aromatic polycarbonate is produced is 1 kg/hr or more.

In conventional methods for producing an aromatic polycarbonate by the transesterification process, for removing by-produced phenol and the like from the liquid reaction system efficiently, it has been attempted to increase the surface renewal of the polymer (being formed) by a very powerful rotary agitation, using horizontal polymerizers as mentioned above. However, it has surprisingly been found that, by performing the transesterification process, using a polymerizer suitable for achieving and maintaining reaction conditions satisfying the relationship defined by formula (1) above, a high quality aromatic polycarbonate having high heat resistance can be obtained at high polymerization rate without suffering discoloration, entry of impurities and generation of a thermal decomposition product, and there is no need for a very large motive power for agitation. This is one of the major aspects of the advantages of the present invention.

In the present invention, the terminology "aromatic dihydroxy compound" means a compound represented by the following formula:

HO—Ar—OH wherein Ar represents a divalent aromatic group.
Preferred examples of divalent aromatic groups as Ar include a group represented by the following formula:

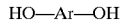

wherein each of $Ar^1$ and $Ar^2$ independently represents a divalent carbocyclic or heterocyclic aromatic group having from 5 to 70 carbon atoms, and Y represents a divalent alkane group having from 1 to 30 carbon atoms.

In the divalent carbocyclic or heterocyclic aromatic groups as $Ar^1$ and $Ar^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Illustrative examples of heterocyclic aromatic groups as $Ar^1$ and $Ar^2$ include an aromatic group having at least one hetero atom, such as a nitrogen atom, an oxygen atom or a sulfur atom.

Examples of divalent aromatic groups as $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups as Y include organic groups respectively represented by the following formulae:

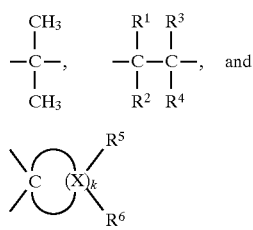

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Specific examples of divalent aromatic groups as Ar include groups respectively represented by the following formulae:

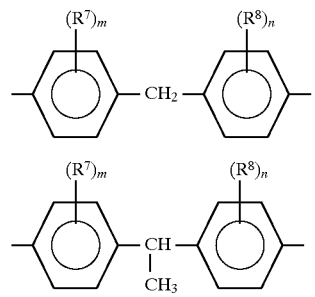

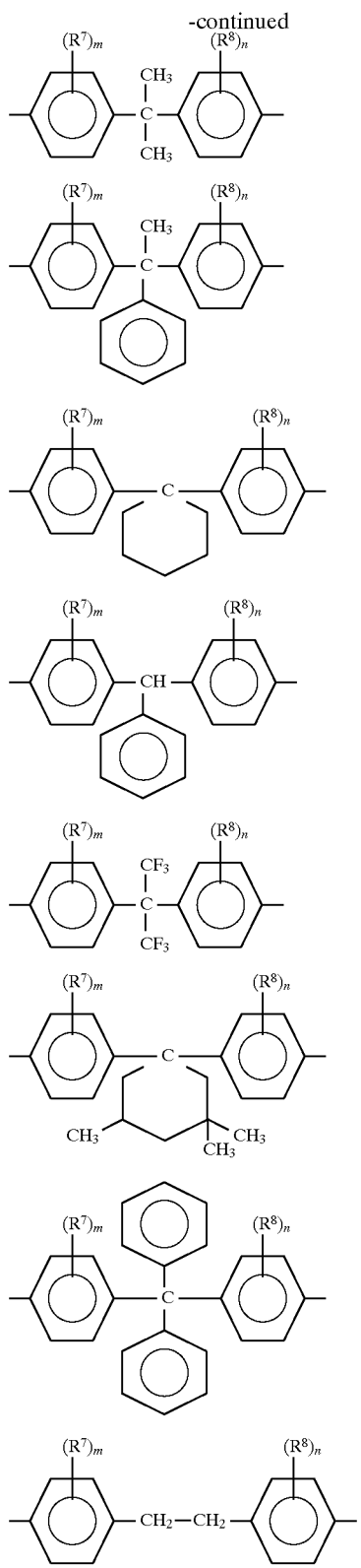

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further, examples of divalent aromatic groups as Ar also include those which are represented by the following formula:

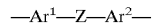

wherein $Ar^1$ and $Ar^2$ are as defined above; and Z represents a single bond or a divalent group, such as —O—, —CO—, —S—, —SO$_2$, —SO—, —COO—, or —CON($R^1$)—, wherein $R^1$ is as defined above.

Examples of such divalent aromatic groups as Ar include groups respectively represented by the following formulae:

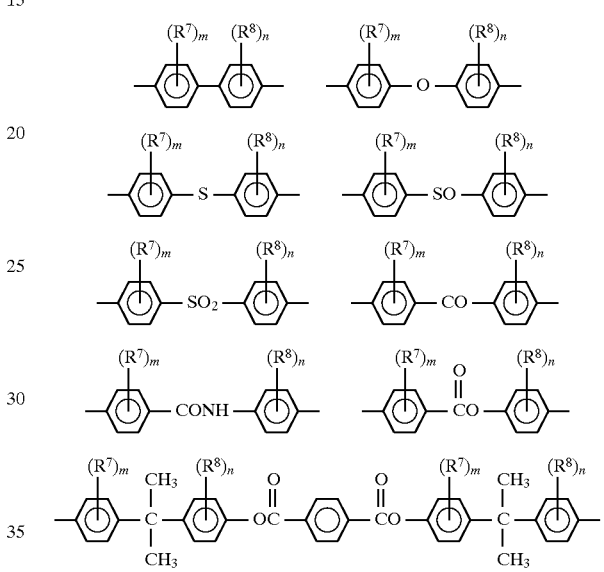

wherein $R^7$, $R^8$, m and n are as defined above.

In the method of the present invention, the aromatic dihydroxy compounds can be used individually or in combination. Representative examples of aromatic dihydroxy compounds include bisphenol A.

The diaryl carbonate used in the present invention is represented by the following formula:

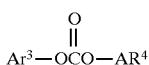

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ are the same or different.

Representative examples of monovalent aromatic groups as $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ are those respectively represented by the following formulae:

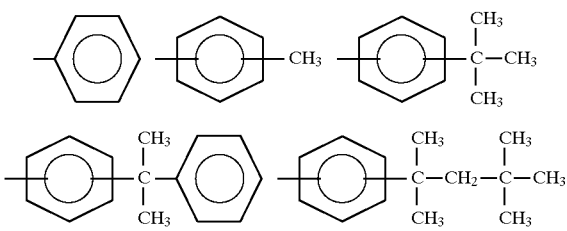

Representative examples of diaryl carbonates include a substituted or unsubstituted diphenyl carbonate compound represented by the following formula:

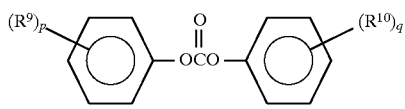

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diphenyl carbonate compounds, preferred are diaryl carbonates having a symmetrical configuration, such as (unsubstituted) diphenyl carbonate and a diphenyl carbonate substituted with a lower alkyl group, e.g., ditolyl carbonate and di-t-butylphenyl carbonate. Particularly preferred is diphenyl carbonate, which is the diaryl carbonate having the simplest structure.

These diaryl carbonates may be used individually or in combination.

The ratio in which the aromatic dihydroxy compound and the diaryl carbonate are used (i.e. a charging ratio) may vary depending on the types of the aromatic dihydroxy compound and diaryl carbonate employed, the polymerization temperature and other polymerization conditions. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

The number average molecular weight of the aromatic polycarbonate obtained according to the method of the present invention is generally from 500 to 100,000, preferably from 2,000 to 30,000.

As mentioned above, in the present invention, as a raw material, use is made of at least one polymerizable material selected from the group consisting of:
 a molten monomer mixture of an aromatic dihydroxy compound and a diaryl carbonate, and
 a molten prepolymer obtained by a process comprising reacting an aromatic dihydroxy compound with a diaryl carbonate.

Even when a monomer mixture of an aromatic dihydroxy compound and a diaryl carbonate is simply melted by heating, a polymerization reaction proceeds to some extent. Therefore, a molten monomer mixture of an aromatic dihydroxy compound and a diaryl carbonate is substantially equivalent to a molten prepolymer. In this sense, the polymerizable material is hereinafter, frequently referred to as "prepolymer". Further, when the prepolymer is one which is having its polymerization degree increased by the method of the present invention, the prepolymer is hereinafter, occasionally referred to simply as "polymer".

The molten prepolymer used in the present invention as a polymerizable material may be one obtained by any conventional polymerization method.

In the present invention, the evaporation surface area S ($m^2$) is an index of the area of the interface between the polymer liquid phase and the gas phase, and is defined as the area of the exposed surface of the liquid mass of polymerizable material. Usually, a gas-liquid interface assumes a wavy, complicated configuration due to the agitation, turbulence, foaming or the like, so that it is difficult to measure the area of the gas-liquid interface precisely. However, in the present invention, the area of the exposed surface of the liquid mass, that is, the evaporation surface area S ($m^2$), is determined on the assumption that the liquid polymer is in a stationary state in which there is no agitation, turbulence, foaming or the like.

Illustrative explanation will be made below on how to determine the evaporation surface area S ($m^2$) defined in the present invention.

In the method of the present invention, even when the surface of the polymer liquid in the polymerizer is in a wavy state due to the agitation, turbulence, foaming or the like, assuming that the horizontal or flown-down liquid surface is in a stationary smooth state in which no agitation, turbulence, foaming or the like occurs, the area of the horizontal or flown-down smooth liquid surface ($m^2$) is taken as the evaporation surface area S ($m^2$).

When the reaction is performed in a wetting fall mode, the polymer liquid in the polymerizer is caused to fall along and in contact with a part or entire of a surface (hereinafter, frequently referred to as "polymer-flowing wall surface") of a solid object selected from the group consisting of an inner wall of the polymerizer and a guide. In this case, it is assumed that the polymer liquid has a uniform thickness and forms a flowing liquid surface having a configuration which is congruent with or homothetic to the configuration of the polymer-flowing wall surface. (For example, when a high viscosity polymer liquid is caused to flow down along a wire, the flowing polymer liquid has a peripheral configuration larger than and homothetic to the peripheral configuration of the wire.). The area ($m^2$) of such a flowing liquid surface of the polymer liquid is taken as the evaporation surface area S ($m^2$) of the flowing polymer liquid. Specifically, when the polymer-flowing wall surface is a plane, the area ($m^2$) of a planar flowing liquid surface is the evaporation surface area S ($m^2$) of the flowing polymer liquid. When the polymer-flowing wall surface is cylindrical, the area ($m^2$) of a cylindrical flowing liquid surface is the evaporation area S ($m^2$) of the flowing polymer liquid. It should be noted that when the area of the flowing liquid surface of the polymer liquid (i.e., the evaporation surface area S of the flowing polymer liquid) is directly obtained from the area of the polymer-flowing wall surface, possible tiny bumps and dents (of a size of up to several hundred $\mu m$) on the polymer-flowing wall surface are disregarded, and the polymer-flowing wall surface is assumed to be smooth. Further, in the determination of the area of the flowing liquid surface of the polymer liquid (i.e., the evaporation surface area S of the flowing polymer liquid), it is also assumed that, when the polymer flows down along the polymer-flowing wall surface, the liquid mass of the polymer does not become widened in a direction perpendicular to the flow direction, but flows while maintaining the same width as at the starting point of the flowing down. For example, in the determination of the area of the flowing liquid surface of the flowing polymer liquid (i.e., the evaporation surface area S of the flowing polymer liquid), it is assumed that, when a prepolymer is fed to a cylindrical polymerizer through a prepolymer inlet positioned at an upper side-wall of the polymerizer, the polymer flows down along the inner wall surface of the polymerizer to the bottom of the polymerizer while maintaining the same width as at the time the polymer flows out from the inner opening of the prepolymer inlet. The width of the flowing polymer liquid at the time the polymer flows out from the inner opening of the prepolymer inlet varies depending on the viscosity of the prepolymer, the feeding rate of the prepolymer and the design of the prepolymer inlet. In the present invention, when the polymer liquid falls freely in the polymerizer in the form of a filament or a droplet (wherein the polymer liquid does not fall along and in contact with an inner wall surface of the polymerizer or the surface of a guide), the gas-liquid interface of the freely falling polymer liquid is not included in the evaporation surface area S ($m^2$) defined in the present invention. Further, when the falling liquid mass of polymer has a portion which does not fall along and in contact with an inner wall surface of the polymerizer or the surface of a guide but falls freely, the area of the exposed surface of the liquid mass of the polymer in such a portion is not included in the evaporation surface area S ($m^2$) defined in the present invention. When a plurality of guides provide a plurality of flowing liquid surfaces, the total area S ($m^2$) of all of the plurality of flowing liquid surfaces is the evaporation surface area S ($m^2$) defined in the present invention.

When a polymer liquid having a horizontal liquid surface is present in the bottom portion of the polymerizer in addition the a polymer liquid flowing down along the polymer-flowing wall surface and having a flowing liquid surface, the total area of the horizontal liquid surface and the flowing liquid surface is the evaporation surface area S ($m^2$) defined in the present invention.

Figure 7:
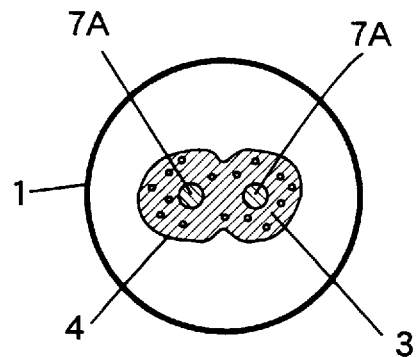
FIG. 7(a) is a diagrammatic cross-sectional view of a further mode of the polymerization method of the present invention, explaining the evaporation area S (m$^2$) which is one of the requirements used for defining the present invention.
FIG. 7(b) is a diagrammatic cross-sectional view showing how to define the evaporation area S (m$^2$) in the mode of FIG. 7(a).
Figure 7:
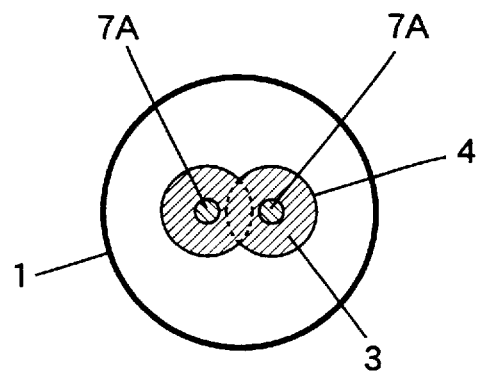

Further, in the determination of the evaporation surface area S, when one flowing liquid surface (on one polymer-flowing wall surface) interferes with another flowing liquid surface (on another polymer-flowing wall surface) to thereby produce respective portions of both the flowing liquid surfaces which portions are not exposed to the gas phase, the areas of such portions of the flowing liquid surfaces are not included in the evaporation surface area S ($m^2$) defined in the present invention [see, for example, FIGS. 7(a) and 7(b)].

In the present invention, the volume V ($m^3$) of the liquid mass of polymerizable material means the volume of polymer which is present in the polymerizer and substantially participates in the reaction. The volume V ($m^3$) of the liquid mass defined in the present invention does not include the volume of the polymer liquid which is present in the pipes and the like which are connected to the polymerizer and used for transporting or temporarily accumulating the polymer liquid.

Referring to Figures, more illustrative explanation will be made below on how to determine the evaporation surface area S ($m^2$) and the volume V ($m^3$) of the liquid mass of polymerizable material, both defined in the present invention.

FIG. 1(a) is a diagrammatic view of a vertical agitation type polymerizer, showing a polymerization process in which a prepolymer is fed in a volume of V ($m^3$) in the form of a filament through inlet 5 into the polymerizer, while agitating the prepolymer in the polymerizer, so that a wavy, complicated gas-liquid interface is formed by agitation and foaming. FIG. 1(b) shows an imaginary state, in which a prepolymer having the same V ($m^3$) as in FIG. 1(a) is not agitated, and there is no foaming, so that a stationary smooth gas-liquid interface is formed in the polymerizer. In the present invention, when the polymerization is performed by a process as shown in FIG. 1(a), the evaporation surface area S ($m^2$) is determined on the assumption that the evaporation surface is stationary smooth surface 4 as shown in FIG. 1(b).

In the polymerization process shown in FIG. 1(a), when the polymerization is performed in a continuous manner, the volume V ($m^3$) can be obtained by a method in which the weight of the polymer liquid in the polymerizer is obtained by subtracting the total weight of a polymer withdrawn from the polymerizer, an evaporated substance, such as a by-produced, evaporated aromatic monohydroxy compound, and a prepolymer in the conduits (arranged in the polymerizer) and the like from the weight of the prepolymer fed to the polymerizer; and the weight of the polymer liquid in the polymerizer is then converted to the volume thereof, using the specific gravity of the polymer liquid as measured at the polymerization temperature. [In addition to the evaporated monohydroxy compound, the above-mentioned evaporated substance may also contain small amounts of a diaryl carbonate, an aromatic dihydroxy compound and an extremely low molecular weight prepolymer (oligomer), depending on the polymerization conditions.] The amount of the evaporated aromatic monohydroxy compound can be obtained by measuring the weight of a condensate of the whole of the evaporated substance (including the by-produced aromatic monohydroxy compound) distilled off through a vent of the polymerizer. In the present invention, the specific gravity of the polymer liquid (at the polymerization temperature) in the polymerizer is assumed to be 1,100 kg/$m^3$. When the polymerization is performed in a batchwise manner, the volume V ($m^3$) can be obtained by a method in which the weight of the polymer liquid in the polymerizer is obtained by subtracting the total weight of an evaporated substance, such as a by-produced, evaporated aromatic monohydroxy compound, and a prepolymer in the conduits and the like from the weight of the prepolymer charged to the polymerizer; and the weight of the polymer liquid in the polymerizer is then converted to the volume thereof, using the specific gravity (1,100 kg/$m^3$) of the polymer liquid as measured at the polymerization temperature.

Figure 2:
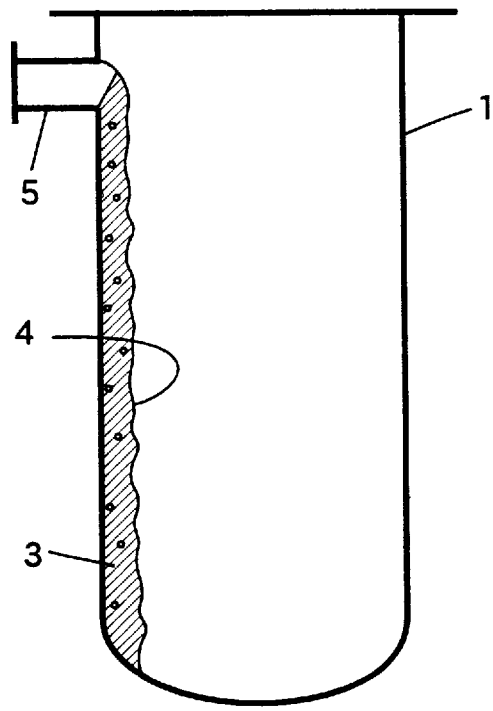
FIG. 2(b-1) is a diagrammatic view showing how to define the evaporation area S (m$^2$) in the mode of FIG. 2(a)
Figure 2:
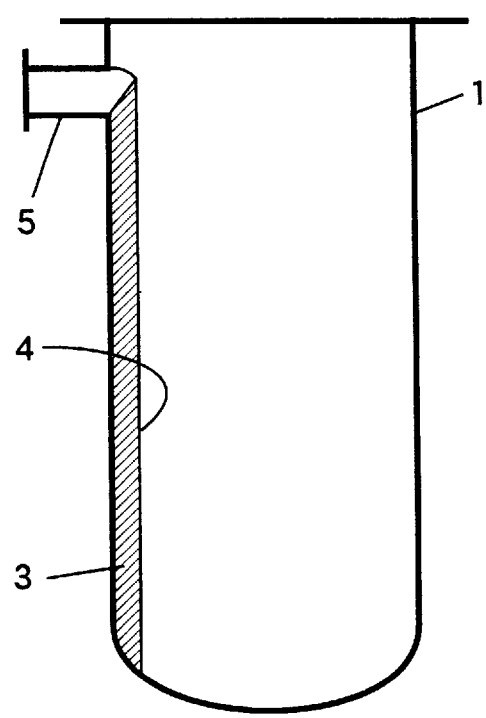
Figure 2:
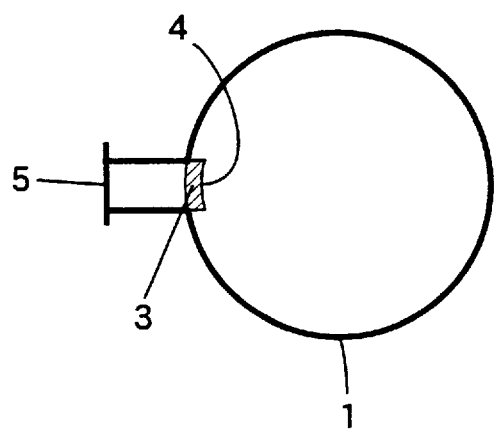

FIG. 2(a) shows one mode of a wall-wetting fall polymerization process, in which a prepolymer falls along and in contact with an inner wall of a cylindrical polymerizer. In FIG. 2(b-1) and FIG. 2(b-2), the process of FIG. 2(a) is illustrated on the assumption that the prepolymer of the same volume as in FIG. 2(a), which falls along and in contact with the inner wall of the cylindrical polymerizer, is present in the form of a liquid mass having a uniform thickness and having a flowing liquid surface 4 having an arc configuration in cross-section, but not in the form of a wavy liquid mass as shown in FIG. 2(a). In the present invention, when the polymerization is performed by a process as shown in FIG. 2(a), the evaporation surface area S ($m^2$) is determined on the assumption that the evaporation surface is flowing liquid surface 4 having an arc configuration in cross-section as shown in FIG. 2(b-1) and FIG. 2(b-2). The areas of the side surfaces of the liquid mass shown in FIG. 2(b-2), which side surfaces extend along the thicknesswise direction of the liquid mass and are substantially perpendicular to flowing liquid surface 4, are not included in the evaporation surface area S ($m^2$), because each of these side surfaces does not have a configuration which is congruent with or homothetic to the polymer-flowing wall surface of the polymerizer. Further, as in FIG. 2(b-2), in the present invention, it is assumed that the prepolymer fed through the prepolymer inlet to the polymerizer falls down along the inner wall surface of the polymerizer while maintaining the same width as at the time the prepolymer flows out from the inner opening of the prepolymer inlet, and without spreading in the direction along the curvature of the inner wall surface of the polymerizer.

In the polymerization process shown in FIG. 2(a), when the polymerization is performed in a continuous manner, the volume V (m³) can be obtained by a method in which the weight of the polymer liquid in the polymerizer is obtained by subtracting the total weight of a D polymer withdrawn from the polymerizer, an evaporated substance, such as a by-produced, evaporated aromatic monohydroxy compound, and a prepolymer in the conduits (arranged in the polymerizer) and the like from the weight of the prepolymer fed to the polymerizer; and the weight of the liquid in the polymerizer is then converted to the volume thereof, using the specific gravity (1,100 kg/cm³) of the polymer liquid as measured at the polymerization temperature. When the polymerization is performed in a batchwise manner, the volume V (m³) can be obtained by a method in which the weight of the polymer liquid in the polymerizer is obtained by subtracting the total weight of an evaporated substance, such as a by-produced, evaporated aromatic monohydroxy compound, and a prepolymer in the conduits and the like from the weight of the prepolymer fed to the polymerizer; and the weight of the polymer liquid in the polymerizer is then converted to the volume thereof, using the specific gravity (1,100 kg/m³) of the polymer liquid as measured at the polymerization temperature.

FIG. 7(a) is a diagrammatic horizontal cross-sectional view of a polymerizer, showing a polymerization process performed by allowing a polymer liquid to fall along and in contact with each of mutually adjacent two column-shaped guides, wherein the respective wavy flowing liquid surfaces on the two column-shaped guides 7A interfere with each other to thereby produce respective portions of both the wavy flowing liquid surfaces which portions are not exposed to the gas phase. In FIG. 7(b), the process of FIG. 7(a) is illustrated on the assumption that the polymer liquid of the same volume as in FIG. 7(a) falls along and in contact with the column-shaped guides 7A in the form of mutually overlapping two cylindrical liquid masses of polymer, but not in the form of a wavy liquid mass as shown in FIG. 7(a). In the present invention, the respective portions of both the cylindrical flowing liquid surfaces shown in FIG. 7(b), which are indicated by using the broken lines, are not included in the evaporation surface area S (m²), because these portions are not exposed to the gas phase. In the present invention, the area of the exposed surface 4 of the polymer liquid, indicated by using the solid line in FIG. 7(b), is taken as the evaporation surface area S (m²).

In the present invention, the polymerization is performed under reaction conditions such that the evaporation surface area S (m²), the volume V (m³) of the liquid mass of polymerizable material in the polymerizer, and the number average molecular weight ($\overline{M}n$) of the aromatic polycarbonate to be produced satisfy the relationships represented by the following formula (1):

$$\log (S/V) \geq 2\times 10^{-5} \times \overline{M}n + 0.8 \qquad (1)$$

[It should be noted that formula (1) above is valid only when the unit of the evaporation surface area S is m² and the unit of the volume V of the liquid mass is m³.] The formula (1) is an empirical formula obtained by the present inventors in their production of polycarbonates having various average molecular weights under various polymerization conditions in which the S (m²)/V (m³) ratio was varied. When the polymerization is performed under conditions in which the S (m²)/V (m³) ratio is outside the range as defined in the formula (1), it becomes difficult to produce a high quality polycarbonate having high heat resistance at high polymerization rate without suffering discoloration, entry of impurities and generation of a thermal decomposition product.

With respect to the type of the polymerizer used in the present invention, there is no particular limitation as long as reaction conditions which satisfy the above-mentioned formula (1) can be achieved and maintained. However, it is especially preferred to use a polymerizer designed for performing a polymerization by allowing a polymer liquid to fall along and in contact with a surface of a guide. It is more preferred that the above-mentioned type of polymerizer have a plurality of guides. Examples of the shapes of the guide used in such a polymerizer include a plate, a cylinder, a cone, a chain and the like. Further, for example, the guide may be hollow. In the case of the hollow guide, for example, the polymerization may be performed by allowing a polymer liquid to fall along and in contact with an outer wall surface of the hollow guide, while introducing a heating medium to the hollow portion of the guide, or the polymerization may be performed by allowing a polymer liquid to fall along and in contact with an inner wall surface of the hollow guide, while applying a heating medium to the outer wall of the hollow guide.

In the production of an aromatic polycarbonate by the method of the present invention, a single polymerizer which is constructed so as to achieve and maintain reaction conditions satisfying the formula (1) may be used, or a plurality of such polymerizers may be used. Further, a polymerizer which is constructed so as to achieve and maintain reaction conditions satisfying the requirements of the present invention may be used in combination with other polymerizers for producing an aromatic polycarbonate. The method of the present invention is advantageous especially when the polymerizable material used has a relatively high viscosity (specifically, a polymerizable material having a number average molecular weight of about 1,500 or more). Therefore, in one preferred mode of the method of the present invention, a prepolymer having a number average molecular weight not less than about 1,500 is produced by reacting an aromatic dihydroxy compound with a diaryl carbonate using, for example, a vertical agitation type polymerizer, and then the obtained prepolymer is polymerized using a polymerizer which is constructed so as to achieve and maintain reaction conditions satisfying the requirements of the present invention.

Hereinbelow, explanation is made with respect to specific examples of polymerizers usable in the present invention with reference to FIGS. 3(a) and 3(b), FIGS. 4(a) and 4(b), FIG. 5, and FIGS. 6(a) and 6(b). However, in the present invention, the polymerizer is not limited to those specific examples.

FIG. 3(a) and FIG. 3(b) show polymerizer 1 having a plurality of plate-shaped guides 7, along and in contact with which polymer 3 is to be allowed to fall. FIG. 3(a) is a diagrammatic vertical cross-sectional view of polymerizer 1, showing longitudinal cross-sections of the plate-shaped guides 7 taken in a thicknesswise direction thereof. FIG. 3(b) is a diagrammatic cross-sectional view of the polymerizer of FIG. 3(a), taken along the line III(b)—III(b). In FIG. 3(a), prepolymer 3 is fed through inlet 5 onto distributing plate 6 having holes, and is distributed by distributing plate 6 to the plurality of plate-shaped guides 7. Prepolymer 3 is allowed to fall along and in contact with both opposite flat surfaces of each plate-shaped guide 7. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. Polymer which has had its molecular weight increased during the guide-wetting fall thereof is discharged through outlet 10. It is requisite that the volume V (m$^3$) and the evaporation surface area S (m$^2$) of the liquid mass of the polymerizable material in the polymerizer, and the number average molecular weight $\overline{M}n$ of the polymer discharged from the polymerizer satisfy the relationship of the above-mentioned formula (1). The discharged polymer may be recirculated to inlet 5 and again allowed to fall along and in contact with plate-shaped guides 7 to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Guide 7 can be fixed, for example, to distributing plate 6 or to a wire hung from the upper inner wall of the polymerizer.

The use of this type polymerizer is commercially advantageous, since the production rate of an aromatic polycarbonate can be easily increased by increasing the surface area of plate-shaped guide 7 or increasing the number of plate-shaped guides 7, so that a scale-up of the production can be easily performed.

FIG. 4(a) and FIG. 4(b) show polymerizer 1 having a plurality of column-shaped guides 7A, along and in contact with which polymer 3 is to be allowed to fall. FIG. 4(a) is a diagrammatic vertical cross-sectional view of polymerizer 1. FIG. 4(b) is a diagrammatic cross-sectional view of the polymerizer of FIG. 4(a), taken along the line IV(b)—IV(b). In FIG. 4(a), prepolymer 3 is fed through inlet 5 onto distributing plate 6 having holes, and is distributed by distributing plate 6 to the plurality of column-shaped guides 7A. Prepolymer 3 is allowed to fall along and in contact with the surface of each column-shaped guide 7A. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. Polymer which has had its molecular weight increased during the guide-wetting fall thereof is discharged through outlet 10. It is requisite that the volume V (m$^3$) and the evaporation surface area S (m$^2$) of the liquid mass of the polymerizable material in the polymerizer, and the number average molecular weight $\overline{M}n$ of the polymer discharged from the polymerizer satisfy the relationship of the above-mentioned formula (1). The discharged polymer may be recirculated to inlet 5 and again allowed to fall along and in contact with column-shaped guides 7A to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Guide 7A can be fixed, for example, to distributing plate 6 or to a wire hung from the upper inner wall of the polymerizer.

The use of this type polymerizer is commercially advantageous, since the production rate of an aromatic polycarbonate can be easily increased by increasing the number of column-shaped guides 7A, so that a scale-up of the production can be easily performed.

Figure 5:
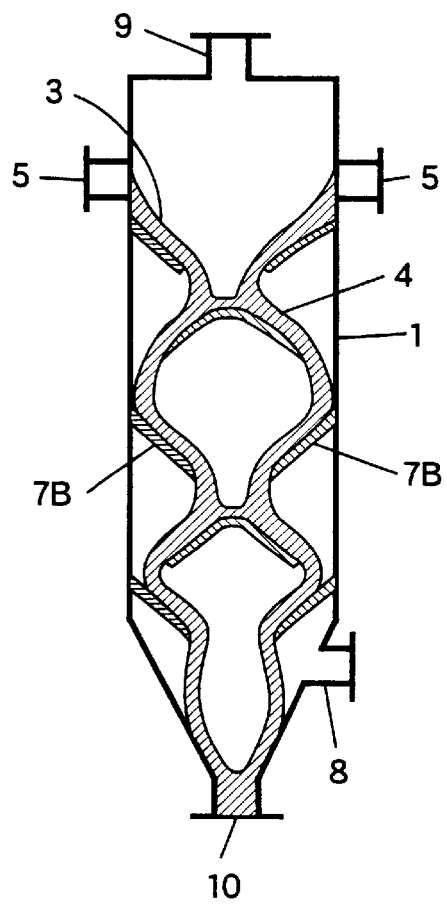
FIG. 5 is a diagrammatic cross-sectional view of still another form of polymerizer usable in the method of the present invention.

FIG. 5 shows polymerizer 1 having a plurality of cone-shaped guides 7B, along and in contact with which polymer 3 is to be allowed to fall. FIG. 5 is a diagrammatic vertical cross-sectional view of polymerizer 1. In FIG. 5, prepolymer 3 is fed through a pair of opposite inlets 5 and allowed to fall along and in contact with the uppermost first-stage cone-shaped guide. Then, prepolymer 3, which has left the uppermost first-stage cone-shaped guide 7B, reaches the second-stage cone-shaped guide 7B and is allowed to fall along and in contact with the second-stage cone-shaped guide. In this manner, the prepolymer falls along and in contact with the vertically arranged several cone-shaped guides 7B successively until it reaches the bottom of the polymerizer. A by-produced aromatic monohydroxy compound and the like are evaporated from evaporation surface 4 of prepolymer 3. The interior of polymerizer 1 is maintained at reduced pressure. Not only an aromatic monohydroxy compound as by-product and the like, but also an inert gas, which is optionally fed from gas feed port 8, is discharged through vent 9. Polymer which has had its molecular weight increased during the guide-wetting fall thereof is discharged through outlet 10. It is requisite that the volume V (m$^3$) and the evaporation surface area S (m$^2$) of the liquid mass of the polymerizable material in the polymerizer, and the number average molecular weight $\overline{M}n$ of the polymer discharged from the polymerizer satisfy the relationship of the above-mentioned formula (1). In this mode of the method of the present invention, at the transition of the prepolymer from a higher stage cone-shaped guide to a lower stage cone-shaped guide, the prepolymer has a portion which does not fall along and in contact with any guiding surface of a cone-shaped guide, but falls freely. As mentioned above, the exposed surface area of such a free-falling portion of the prepolymer is not included in the evaporation surface area S as defined in the present invention. The discharged polymer may be recirculated to inlets 5 and again allowed to fall along and in contact with cone-shaped guides 7B to further increase the molecular weight of the polymer. The polymerization may be performed in either a batchwise manner or a continuous manner. When the polymerization is performed in a batchwise manner, a polymer discharged from the polymerizer may be repeatedly recirculated to inlets 5. When the polymerization is performed in a continuous manner, it is possible that prepolymer 3 is continuously fed through a pair of opposite inlets 5 and a polymer which has had its molecular weight increased during the guide-wetting fall thereof is continuously discharged through outlet 10. Alternatively, in the continuous manner practice, it is also possible that fresh prepolymer 3 is continuously fed through inlets 5, and a part of a discharged polymer which has had its molecular weight increased during the guide-wetting fall thereof is continuously recirculated to and fed through inlets 5 together with continuously fed fresh prepolymer 3, while continuously withdrawing the remainder of the discharged polymer from polymerizer 1 through outlet 10. The polymerizer is heated to and kept at an elevated temperature by means of a heater or a jacket (not shown). Among the cone-shaped guides 7B shown in FIG. 5, each of umbrella-shaped guides disposed at intermediate portions in the polymerizer can be fixed, for example, to a rod projecting from an inner wall of the polymerizer or to a wire hung from the upper inner wall of the polymerizer.

The use of this type polymerizer is commercially advantageous, since the production rate of an aromatic polycarbonate can be easily increased by increasing the surface area of cone-shaped guide 7B, so that a scale-up of the production can be easily performed.

Figure 6:
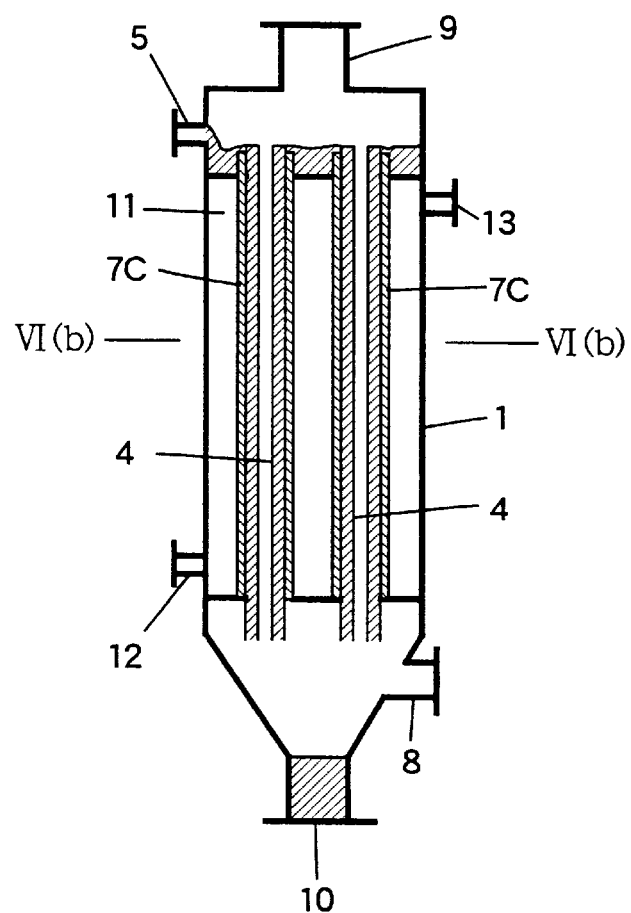
FIG. 6(a) is a diagrammatic cross-sectional view of a further form of polymerizer usable in the method of the present invention.
FIG. 6(b) is a diagrammatic cross-sectional view of the polymerizer of FIG. 6(a), taken along the line VI(b)—VI(b)
Figure 6:
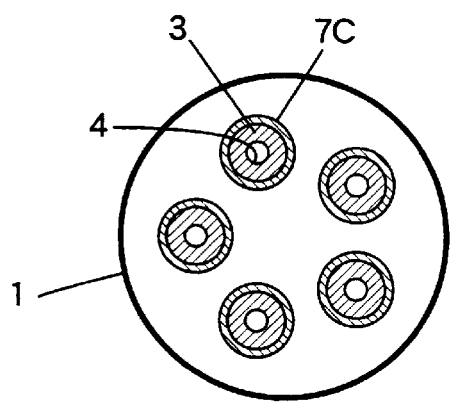

FIG. 6(*a*) and FIG. 6(*b*) show polymerizer 1 having a plurality of cylindrical tubular guides 7C each having an inner wall surface, along and in contact with which polymer 3 is to be allowed to fall. FIG. 6(*a*) is a diagrammatic vertical cross-sectional view of polymerizer 1. FIG. 6(*b*) is a diagrammatic cross-sectional view of the polymerizer of FIG. 6(*a*), taken along the line VI(*b*)—VI(*b*). In FIG. 6(*a*), prepolymer 3 is fed through inlet 5 to the polymerizer and accumulated at an upper portion of the interior of the polymerizer. Then, the accumulated prepolymer 3 is distributed, by overflowing, to the plurality of cylindrical tubular guides 7C which are fixed to upper and lower portions of the inner walls of shell-chamber 11. Prepolymer 3 is allowed to fall along and in contact with the inner wall of each cylindrical tubular guide 7C. A by-produced aromatic monohydroxy compound and the like are evaporated from evaporation surface 4 of prepolymer 3. The interior of polymerizer 1 is maintained at reduced pressure. Not only an aromatic monohydroxy compound as a by-product and the like, but also an inert gas, which is optionally fed from gas feed port 8, is discharged through vent 9. Polymer which has had its molecular weight increased during the guide-wetting fall thereof is discharged through outlet 10. It is requisite that the volume V (m$^3$) and the evaporation surface area S (m$^2$) of the liquid mass of the polymerizable material in the polymerizer, and the number average molecular weight $\overline{Mn}$ of the polymer discharged from the polymerizer satisfy the relationship of the above-mentioned formula (1). The discharged polymer may be recirculated to inlet 5 and again allowed to fall along and in contact with cylindrical tubular guides 7C to further increase the molecular weight of the polymer. The polymerization may be performed in either a batchwise manner or a continuous manner. When the polymerization is performed in a batchwise manner, a polymer discharged from the polymerizer may be repeatedly recirculated to inlet 5. When the polymerization is performed in a continuous manner, it is possible that prepolymer 3 is continuously fed through inlet 5 and a polymer which has had its molecular weight increased during the guide-wetting fall thereof is continuously discharged through outlet 10. Alternatively, in the continuous manner practice, it is also possible that fresh prepolymer 3 is continuously fed through inlet 5, and a part of a discharged polymer which has had its molecular weight increased during the guide-wetting fall thereof is continuously recirculated to and fed through inlet 5 together with continuously fed fresh prepolymer 3, while continuously withdrawing the remainder of the discharged polymer from polymerizer 1 through outlet 10. Shell-chamber 11, which is a space surrounding the outer wall surface of each cylindrical tubular guide 7C, is heated by a heating medium. The heating medium is fed to shell-chamber 11 through inlet 12 for heating medium and discharged through outlet 13. As a heating medium, conventional heating mediums can be used. Examples of heating mediums include various heating mediums described in pages 109 to 110 of "Netsu-kokanki Handbook (Handbook of Heat Exchangers)" (fifth edition, edited by the Editorial Committee of the Handbook of Heat Exchangers, and published by The Nikkan Kogyo Shimbun Ltd., Japan). Specific examples of heating mediums include heated steam, molten salt, SK-OIL#260, SK-OIL#240 and SK-OIL#170.

The use of this type polymerizer is commercially advantageous, since the production rate of an aromatic polycarbonate can be easily increased by increasing the number of cylindrical tubular guides 7C, so that a scale-up of the production can be easily performed.

In the present invention, it is preferred that the volume V of the liquid mass of polymerizable material be 5% or more, based on the internal volume of the polymerizer. When the volume V of the liquid mass of polymerizable material is less than 5%, based on the internal volume of the polymerizer, the size of the polymerizer needs to be large, which is commercially undesirable.

In the present invention, it is preferred that the evaporation surface area S (m$^2$) of the liquid mass of polymerizable material satisfy the following formula (2):

$$S \geq 0.03Q \quad (2)$$

wherein Q represents the rate (kg/hr) at which the aromatic polycarbonate is produced (hereinafter, frequently referred to simply as "production rate").

[It should be noted that formula (2) above is valid only when the unit of the evaporation surface area S is m$^2$ and the unit of the production rate Q is kg/hr.] When the evaporation surface area S does not satisfy formula (2), it is possible that when the production of an aromatic polycarbonate is performed on a commercial scale, there arises a need of effecting an extremely efficient surface renewal of the polymer being formed, wherein the polymer is caused to sustain a large shear, leading to a lowering of the quality of the final polymer, for example, occurrence of discoloration.

As mentioned above, the method of the present invention is advantageous especially when the production of an aromatic polycarbonate is performed on a commercial scale. There is no particular limitation with respect to the production rate Q (kg/hr) of the aromatic polycarbonate. However, generally, it is preferred that the production rate Q (kg/hr) of the aromatic polycarbonate is produced be 1 kg/hr or more, more preferably 3 kg/hr or more.

In the present invention, the polymerization temperature is generally in the range of from 100° to 350° C., preferably from 150° to 290° C.

As the reaction proceeds, an aromatic monohydroxy compound is by-produced. By removing the aromatic monohydroxy compound from the reaction system, the reaction rate can be increased. Therefore, in the method of the present invention, it is preferable to employ a method in which an inert gas which does not adversely affect the reaction, such as nitrogen, argon, helium, carbon dioxide and a lower hydrocarbon gas, is introduced so that the by-produced aromatic monohydroxy compound is entrained by the inert gas, and the inert gas entraining the aromatic monohydroxy compound is withdrawn to remove the aromatic monohydroxy compound, or a method in which the reaction is carried out under reduced pressure. The above two methods can be used individually or in combination. The preferred reaction pressure may vary depending on the type of the aromatic polycarbonate to be produced, the molecular weight of the molten monomer mixture or molten prepolymer, and the polymerization temperature. For example, in the case of a reaction in which an aromatic polycarbonate is produced from bisphenol A and diphenyl carbonate, when the number average molecular weight of the molten monomer mixture or molten prepolymer is less than 1,000, the reaction pressure is preferably from 6,660 Pa (50 mmHg) to atmospheric pressure. In this case, when the number average molecular weight is from 1,000 to 2,000, the reaction pressure is preferably from 400 to 6,660 Pa (3 to 50 mmHg). When the number average molecular weight is greater than 2,000, the reaction pressure is preferably 2,670 Pa (20 mmHg) or less, more preferably 1,330 Pa (10 mmHg) or less, still more preferably 267 Pa (2 mmHg) or less.

It is particularly preferred that the polymerization be carried out under reduced pressure while introducing an inert gas as mentioned above.

The polymerization by the transesterification process may be carried out in the absence of a catalyst. However, when it is desired to accelerate the polymerization rate, the polymerization can be effected in the presence of a catalyst. The polymerization catalysts which are customarily used in the art can be used without particular limitations. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO-Ar-OLi wherein Ar represents an aryl group, and NaO-Ar-ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula:

$$(R^1 R^2 R^3 R^4)PB(R^1 R^2 R^3 R^4),$$

wherein $R^1$, $R^2$, $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts to be used is generally in the range of from $10^{-8}$ to 1% by weight, preferably from $10^{-7}$ to $10^{-1}$% by weight, based on the weight of the aromatic dihydroxy compound.

With respect to materials for constructing the polymerizers to be used in the method of the present invention, there is no particular limitation, but stainless steel, nickel or glass is generally used as a material for at least the inner wall portions of polymerizers With respect to materials for the guide used in the present invention, there is no particular limitation. However, preferred examples of materials for the guide include metals, glass and ceramics. Examples of metals include stainless steel, carbon steel, nickel, titanium, chromium and alloys, such as Hastelloy.

BEST MODE FOR CARRYING OUT THE INVENTION

Hereinbelow, the present invention will be described in more detail with reference to the following Examples and Comparative Examples, but the Examples should not be construed as limiting the scope of the present invention.

In the following Examples and Comparative Examples, the molecular weight is expressed in terms of the number average molecular weight (hereinafter referred to simply as "$\overline{Mn}$") as measured by gel permeation chromatography (GPC), utilizing the calibration curve obtained with respect to the standard polystyrene samples.

The color of the aromatic polycarbonate produced was evaluated, using a specimen having a thickness of 3.2 mm, in accordance with the CIELAB method, and the yellowness of the specimen is expressed in terms of the b*-value.

EXAMPLE 1

A polymerization reaction was carried out using a cylindrical polymerizer as shown in FIG. 3(a). Polymerizer 1 has an internal volume of 0.57 m$^3$, and is equipped with five plate-shaped guides 7 made of stainless steel SUS316L, each having a thickness of 1 mm, a width of 0.1 m and a length of 7.5 m. Polymerizer 1 is also equipped with distributing plate 6, through which prepolymer 3 fed to polymerizer 1 can be distributed to plate-shaped guides 7 so that the distributed prepolymer 3 can be caused to uniformly fall along and in contact with the surfaces of both opposite sides of each of plate-shaped guides 7. Further, polymerizer 1 has an external jacket (not shown), and the inside of polymerizer 1 is heated by passing a heating medium through the jacket. Polymerizer 1 has no agitating means for the prepolymer.

Prepolymer 3 having an $\overline{M}n$ of 7,000, which had been prepared by reacting bisphenol A with diphenyl carbonate in a molar ratio of 1:1.05, was continuously fed to polymerizer 1 through inlet 5 at a flow rate of 50 kg/hr, so that a polymerization reaction of prepolymer 3 was carried out under polymerization reaction conditions wherein the reaction temperature was 260° C., and the reaction pressure was 53 Pa (0.4 mmHg), while continuously withdrawing a produced aromatic polycarbonate from outlet 10. Each of the aromatic polycarbonate products obtained 25 hours and 50 hours after the start of the polymerization reaction had an $\overline{M}n$ of 11,200. Both of the aromatic polycarbonate products were colorless, transparent (b*-value: 3.4) and contained no impurities and thermal decomposition products.

The liquid volume V (m$^3$) of prepolymer 3 contained in polymerizer 1 at a point in time of 25 hours after the start of the polymerization reaction was determined according to the following formula:

$$V=[(w_1-w_2-w_3)/\rho]-v_0$$

wherein:
- $w_1$ represents the total amount (kg) of prepolymer 3 fed to polymerizer 1 during the 25-hour polymerization reaction;
- $w_2$ represents the total amount (kg) of an aromatic polycarbonate withdrawn from polymerizer 1 during the 25-hour polymerization reaction;
- $w_3$ represents the total amount (kg) of phenol and the like evaporated from polymerizer 1 during the 25-hour polymerization reaction;
- $v_0$ represents the volume (m$^3$) of prepolymer 3 in pipes as determined in terms of the total inner volume of the pipes; and
- $\rho$ represents the specific gravity (kg/m$^3$) of prepolymer 3.

In the above formula, $w_1$ was 1,250 kg, $w_2$ was 1,064 kg, $w_3$ was 10 kg, $v_0$ was 0.01 m$^3$ and $\rho$ was 1,100 kg/m$^3$. Therefore, the liquid volume V of prepolymer 3 in polymerizer 1 at a point in time of 25 hours after the start of the reaction was determined as 0.15 m$^3$. Also, from the evaporation surface area of the horizontal liquid surface of the liquid mass of prepolymer 3 at the bottom of polymerizer 1, the liquid volume of the prepolymer in the bottom portion of polymerizer 1 at a point in time of 25 hours after the start of the reaction was determined as 0.002 m$^3$.

The total evaporation surface area of the flowing liquid surfaces of the liquid mass of prepolymer 3 falling along and in contact with plate-shaped guides 7 at a point in time of 25 hours from the start of the reaction were determined according to the following formula:

Total evaporation surface area of the flowing liquid surfaces on plate-shaped guides 7=(width of each plate-shaped guide 7)×(length of each plate-shaped guide 7)×(number of plate-shaped guides 7)×2=7.5 (m$^2$)

The evaporation surface area of the horizontal surface of the liquid mass of prepolymer 3 in the bottom portion of polymerizer 1 determined 25 hours from the start of the reaction was 0.008 m$^2$. From the above, it was found that the total evaporation surface area of the prepolymer at a point in time of 25 hours after the start of the reaction was about 7.5 m$^2$. The total amount of the prepolymer fed to polymerizer 1 during the polymerization reaction between the points in time of 25 hours and 50 hours after the start of the reaction, was equal to the total amount of the aromatic polycarbonate product withdrawn from polymerizer 1 and the phenol and the like evaporated from polymerizer 1 during the polymerization reaction between the points in time of 25 hours and 50 hours after the start of the reaction. Also, the liquid volume V and the total evaporation surface area S determined 50 hours after the start of the reaction were equal to those determined 25 hours after the start of the reaction.

From the above data, with respect to each of the prepolymers determined 25 hours and 50 hours after the start of the reaction, the values of the left side and right side of the above-mentioned formula (1) were calculated and found to be 1.70 and 1.00, respectively. The liquid volume V of the prepolymer was 26% of the internal volume of polymerizer 1. The rate Q at which the aromatic polycarbonate was produced was 49.6 kg/hr. The produced aromatic polycarbonate was molded at 300° C. to prepare a specimen having a thickness of 3.2 mm. The specimen was subjected to a heat aging test at 125° C. for 400 hours. As a result, it was found that the b*-value was 3.8, and the specimen did not suffer from marked discoloration.

EXAMPLES 2 to 5

Using the same polymerizer as used in Example 1, polymerization reactions of prepolymers having different $\overline{M}n$ values, which had been prepared by reacting bisphenol A and diphenyl carbonate in a molar ratio of 1:1.05, were individually conducted under various polymerization conditions. The liquid volume V and the total evaporation surface area S of each of the prepolymers were determined in the same manner as in Example 1. As a result, it was found that the liquid volume V and the total evaporation surface area S of each prepolymer, and the $\overline{M}n$ of aromatic polycarbonate produced (the S, V and $\overline{M}n$ were determined 50 hours after the start of the reaction) were equal to those determined 25 hours after the start of the reaction. The results are shown in Table 1.

TABLE 1

| Example Nos | Prepolymer $\overline{M}n$ | Prepolymer feed rate (kg/hr) | Temperature (°C.) | Pressure (Pa) | Aromatic polycarbonate product (after 50 hrs) $\overline{M}n$ | Aromatic polycarbonate product (after 50 hrs) b*-value | Total evaporation surface area [S] (m²) | Liquid volume of prepolymer [V] (m³) | Formula (1) left side | Formula (1) right side | Liquid volume of prepolymer internal volume of polymerizer (%) | b*-value measured after heat aging test (125° C., 400 hrs) | Production rate [Q] of produced aromatic polycarbonate (kg/hr) |
|---|---|---|---|---|---|---|---|---|---|---|---|---|---|
| Example 2 | 1900 | 100 | 250 | 267 | 5100 | 3.3 | 7.5 | 0.05 | 2.17 | 0.90 | 9 | 3.7 | 95.4 |
| Example 3 | 4700 | 70 | 250 | 133 | 8200 | 3.3 | 7.5 | 0.14 | 1.73 | 0.96 | 25 | 3.7 | 69.2 |
| Example 4 | 7900 | 60 | 280 | 53 | 17500 | 3.5 | 7.5 | 0.23 | 1.51 | 1.15 | 41 | 3.9 | 59.5 |
| Example 5 | 5800 | 30 | 255 | 107 | 10500 | 3.4 | 7.5 | 0.06 | 2.10 | 1.01 | 11 | 3.8 | 29.7 |

Comparative Example 1

A polymerization reaction was conducted by continuously feeding a prepolymer, which had been prepared in the same manner as in Example 3, to an intermeshing-twin-screw evaporator (internal volume: 0.6 m³; length: 3 m; total number of pitches of the screw: 1,000; and distance between two screws: 0.1 mm), while continuously withdrawing a produced polycarbonate from an outlet of the evaporator. The polymerization reaction was conducted under conditions such that the flow rate of the prepolymer, the reaction temperature and the reaction pressure were the same as those employed in Example 3, and the revolution rate of each screw was 30 rpm. Each of the aromatic polycarbonate products obtained 25 hours and 50 hours after the start of the reaction had an $\overline{M}n$ of 5,100, which was only slightly higher than the $\overline{M}n$ of the prepolymer fed to the evaporator. Further, the aromatic polycarbonate products suffered from discoloration (b*-value: 3.9). With respect to the prepolymer contained in the evaporator, each of the liquid volumes V's determined at points in time of 25 hours and 50 hours after the start of the reaction was 0.23 m³, and each of the evaporation surface areas S's determined at points in time of 25 hours and 50 hours after the start of the reaction (on the assumption that the prepolymer is in stationary state) was 1.3 m².

From the above data, with respect to each of the prepolymers determined 25 hours and 50 hours after the start of the reaction, the values of the left side and right side of the above-mentioned formula (1) were calculated and found to be 0.75 and 0.9, respectively. The production rate Q of the produced aromatic polycarbonate was 69.8 kg/hr. A specimen of the produced aromatic polycarbonate, which was prepared in the same manner as in Example 1, was subjected to heat aging test in the same manner as in Example 1. As a result, it was found that the b*-value was 6.5, and the specimen suffered from marked discoloration.

Comparative Example 2

A polymerization reaction was conducted by continuously feeding a prepolymer, which had been prepared in the same manner as in Example 3, to a horizontal agitation type reactor having twin-screw agitating blades (internal volume: 0.6 m³; length: 3 m; rotation diameter of each agitating blade: 0.25 m), while continuously withdrawing a produced polycarbonate from an outlet of the reactor. The polymerization reaction was conducted under conditions such that the flow rate of the prepolymer, the reaction temperature and the reaction pressure were the same as those employed in Example 3, and the revolution rate of each screw was 15 rpm. Each of the aromatic polycarbonate products obtained 25 hours and 50 hours after the start of the reaction had an $\overline{M}n$ of 5,100, which was only slightly higher than the $\overline{M}n$ of the prepolymer fed to the reactor. Further, the aromatic polycarbonate products suffered from discoloration (b*-value: 3.8). With respect to the prepolymer contained in the evaporator, each of the liquid volumes V's determined at points in time of 25 hours and 50 hours after the start of the reaction was 0.24 m³, and each of the evaporation surface areas S's determined at points in time of 25 hours and 50 hours after the start of the reaction (on the assumption that the prepolymer is in stationary state) was 1.4 m².

From the above data, with respect to each of the prepolymers determined 25 hours and 50 hours after the start of the reaction, the values of the left side and right side of the above-mentioned formula (1) were calculated and found to be 0.76 and 0.9, respectively. The production rate Q of the produced aromatic polycarbonate was 69.8 kg/hr. A specimen of the produced aromatic polycarbonate, which was prepared in the same manner as in Example 1, was subjected to a heat aging test in the same manner as in Example 1. As a result, it was found that the b*-value was 6.2, and the specimen suffered from marked discoloration.

EXAMPLE 6

A polymerization reaction was carried out using a cylindrical polymerizer as shown in FIG. 6(a). As shown in FIG. 6(a), polymerizer 1 has a top chamber having inlet 5, shell chamber 11 and a bottom chamber having outlet 10, and is equipped with nine cylindrical tubular guides 7C made of stainless steel SUS316L, each of which tabular guides has an internal diameter of 53 mm and a length of 6 m. In the polymerizer, the top chamber communicates with the bottom chamber through the tabular guides. The top chamber and bottom chamber are adapted to be heated by passing a heating medium through shell chamber 11. The internal volume of polymerizer 1, i.e., the total of the volumes of the top chamber, shell chamber 11 and the bottom chamber, is 0.22 m³. Prepolymer 3 fed to the top chamber of polymerizer 1 through inlet 5 can be distributed to cylindrical tubular guides 7C by overflowing so that the distributed prepolymer 3 can be caused to uniformly fall along and in contact with the inner wall surface of cylindrical tubular guides 7C. Polymerizer 1 has no agitating means for the prepolymer.

Prepolymer 3 having an $\overline{\text{Mn}}$ of 6,900, which had been prepared by reacting bisphenol A with diphenyl carbonate in a molar ratio of 1:1.07, was continuously fed to polymerizer 1 through inlet 5 at a flow rate of 70 kg/hr, so that a polymerization reaction of prepolymer 3 was carried out under polymerization reaction conditions wherein the reaction temperature was 265° C., and the reaction pressure was 53 Pa (0.4 mmHg), while continuously withdrawing a produced aromatic polycarbonate from outlet 10. Each of the aromatic polycarbonate products obtained 25 hours and 50 hours after the start of the polymerization reaction had an $\overline{\text{Mn}}$ of 10,100. Both of the aromatic polycarbonate products were colorless, transparent (b*-value: 3.4) and contained no impurities and thermal decomposition products. The liquid volume V ($m^3$) of prepolymer 3 contained in polymerizer 1 at a point in time of 25 hours after the start of the polymerization reaction was determined in substantially the same manner as in Example 1, and was found to be 0.13 $m^3$. Also, from the horizontal liquid surface of the liquid mass of prepolymer 3 in the bottom portion of polymerizer 1, the liquid volume of the prepolymer in the bottom portion of polymerizer 1 at a point in time of 25 hours after the start of the reaction was determined as 0.018 $m^3$. Therefore, the liquid volume of prepolymer 3 present in the cylindrical tubular guides 7C was determined as 0.112 $m^3$.

The total evaporation surface area of the flowing liquid surfaces of the liquid mass of prepolymer 3 falling along and in contact with the inner walls of cylindrical tubular guides 7C at a point in time of 25 hours from the start of the reaction were determined according to the following formula:

Total evaporation surface area of the flowing liquid surfaces on the inner walls of cylindrical tubular guides $7C = 2 \times \{(r_1 \times r_1 \times 3.14 - v_1/n_1/l_1)/3.14\}^{0.5} \times 3.14 \times n_1 \times l_1$ wherein:

$r_1$ represents the internal radius (m) of each cylindrical tubular guide;

$v_1$ represents the total liquid volume ($m^3$) of the prepolymer in the cylindrical tubular guides;

$n_1$ represents the number of cylindrical tubular guides; and $l_1$ represents the length (m) of each cylindrical tubular guide.

In the above formula, $r_1$ was 0.0265 m, $v_1$ was 0.112 $m^3$, $n_1$ was 9, and $l_1$ was 6 m. The evaporation surface area of the horizontal surface of the liquid mass of prepolymer 3 in the bottom portion of polymerizer 1 was 0.01 $m^2$. From the above, it was found that the total evaporation surface area S of the prepolymer at a point in time of 25 hours after the start of the reaction was about 2.2 $m^2$. The total amount of the prepolymer fed to polymerizer 1 during the polymerization reaction between the points in time of 25 hours and 50 hours after the start of the reaction, was equal to the total amount of the aromatic polycarbonate product withdrawn from polymerizer 1 and the phenol and the like evaporated from polymerizer 1 during the polymerization reaction between the points in time of 25 hours and 50 hours after the start of the reaction. Also, the liquid volume V and the evaporation surface area S determined 50 hours after the start of the reaction were equal to those determined 25 hours after the start of the reaction.

From the above data, with respect to each of the prepolymers determined 25 hours and 50 hours after the start of the reaction, the values of the left side and right side of the above-mentioned formula (1) were calculated and found to be 1.23 and 1.00, respectively. The liquid volume V of the prepolymer was 59% of the internal volume of polymerizer 1. The production rate Q of the produced aromatic polycarbonate was 69.6 kg/hr.

EXAMPLE 7

A polymerization reaction was carried out using substantially the same polymerizer as used in Example 6 [wherein a polymerizer as shown in FIG. 6(*a*) was used], except that outlet 10 and inlet 5 of the polymerizer are connected to each other by a circulation line so that a part of the produced polymer falling down to the bottom of the polymerizer 1 can be withdrawn from the outlet, while the remaining polymer can be returned to inlet 5 of polymerizer 1 through the circulation line. Polymerizer 1 has no agitating means for the prepolymer.

Prepolymer 3 having an $\overline{\text{Mn}}$ of 1,800, which had been prepared by reacting bisphenol A with diphenyl carbonate in a molar ratio of 1:1, was continuously fed to polymerizer 1 through inlet 5 at a flow rate of 10 kg/hr, so that a polymerization reaction of prepolymer 3 was carried out under polymerization reaction conditions wherein the reaction temperature was 240° C., and the reaction pressure was 133 Pa (1.0 mmHg), while continuously withdrawing a part of a produced aromatic polycarbonate from outlet 10. The remaining polymer was returned to inlet 5 of polymerizer 1 at a flow rate of 200 kg/hr to thereby effect a further polymerization, so that the internal volume of the prepolymer in the bottom portion of polymerizer 1 was maintained at a constant level. Each of the aromatic polycarbonate products obtained 25 hours and 50 hours after the start of the polymerization reaction had an $\overline{\text{Mn}}$ of 6,200. Both of the aromatic polycarbonate products were colorless, transparent (b*-value: 3.3) and contained no impurities and thermal decomposition products. The liquid volume V and the evaporation surface area S of prepolymer 3 contained in polymerizer 1 at a point in time of 25 hours and 50 hours after the start of the polymerization reaction were determined in the same manner as in Example 6. The liquid volume V and the total evaporation surface area S of prepolymer 3 contained in polymerizer 1 at a point in time of 25 hours after the start of the polymerization reaction were determined as 0.09 $m^3$ and 5.6 $m^2$, respectively. Also, the liquid volume V and the total evaporation surface area S determined 50 hours after the start of the reaction were equal to those determined 25 hours after the start of the reaction.

From the above data, with respect to each of the prepolymers obtained 25 hours and 50 hours after the start of the reaction, the values of the left side and right side of the above-mentioned formula (1) were calculated and found to be 1.79 and 0.92, respectively. The liquid volume V of the prepolymer was 41% of the internal volume of polymerizer 1. The production rate Q of the produced aromatic polycarbonate was 9.4 kg/hr.

Comparative Example 3

A polymerization reaction was carried out in substantially the same manner as in Example 7, except that the flow rate of prepolymer 3 to be returned to inlet 5 of polymerizer 1 through the circulation line was changed to 1,100 kg/hr, to thereby produce an aromatic polycarbonate. Each of the aromatic polycarbonate products obtained from outlet 10 at the points in time of 25 hours and 50 hours after the start of the polymerization reaction had an $\overline{\text{Mn}}$ of 2,500. The increase in $\overline{\text{Mn}}$ value during the polymerization, that is, the difference in $\overline{\text{Mn}}$ value between the produced aromatic polycarbonate and the fed prepolymer 3, was 700, which was not larger than ⅙ of the increase in $\overline{\text{Mn}}$ value during the polymerization in Example 7. The liquid volume V of prepolymer 3 in polymerizer 1 and the total evaporation surface area S at each point in time of 25 hours and 50 hours from the start of the polymerization reaction were calculated in the same manner as in Example 6. As a result, it was found that each of the liquid volumes V was 0.13 m³ and each of the evaporation surface areas S was 0.88 m². Accordingly, the left side and right side of the above-mentioned formula (1) was 0.83 and 0.86, respectively. That is, the value of the left side was lower than that of the right side in formula (1).

EXAMPLE 8

A polymerization reaction was carried out using a cylindrical polymerizer as shown in FIG. 4(a). Polymerizer 1 has an internal volume of 0.6 m³ and is equipped with thirty column-shaped guides 7A made of stainless steel SUS316L, each having a diameter of 1 mm and a length of 8 m. Polymerizer 1 is also equipped with distributing plate 6, through which prepolymer 3 fed to polymerizer 1 can be distributed to cylindrical guides 7A so that the distributed prepolymer 3 can be caused to uniformly fall along and in contact with the surface of each of cylindrical guides 7A. Further, the polymerizer 1 has an external jacket (not shown), and the inside of polymerizer 1 is adapted to be heated by passing a heating medium through the jacket. Polymerizer 1 has no agitating means for the prepolymer.

Prepolymer 3 having an $\overline{\text{Mn}}$ of 6,200, which had been prepared by reacting bisphenol A with diphenyl carbonate in a molar ratio of 1:1.05, was continuously fed to polymerizer 1 through inlet 5 at a flow rate of 18 kg/hr, so that a polymerization reaction of prepolymer 3 was carried out under polymerization reaction conditions wherein the reaction temperature was 265° C., and the reaction pressure was 67 Pa (0.5 mmHg), while continuously withdrawing a produced aromatic polycarbonate from outlet 10. Each of the aromatic polycarbonate products obtained 25 hours and 50 hours after the start of the polymerization reaction had an $\overline{\text{Mn}}$ of 11,700. Both of the aromatic polycarbonate products were colorless, transparent (b*-value: 3.4) and contained no impurities and thermal decomposition products. The liquid volume V of prepolymer 3 contained in polymerizer 1 at a point in time of 25 hours after the start of the polymerization reaction was determined as 0.07 m³ in the same manner as in Example 1. Also, from the evaporation surface area of the horizontal liquid surface of the liquid mass of prepolymer 3 in the bottom portion of polymerizer 1, the liquid volume of the prepolymer in the bottom portion of polymerizer 1 at a point in time of 25 hours after the start of the reaction was determined as 0.015 m³. Accordingly, the volume of the liquid mass of the prepolymer 3 falling along and contact with the surface of each of cylindrical guides 7A was 0.055 m³.

The total evaporation surface area of the flowing liquid surfaces of the liquid mass of prepolymer 3 falling along and in contact with the surface of each of cylindrical guides 7A at a point in time of 25 hours from the start of the reaction were determined according to the following formula:

Total evaporation surface area of the flowing liquid surfaces on the column-shaped guides $7A = 2 \times \{(r_2 \times r_2 \times 3.14 + V_2/n_2/l_2)/3.14\}^{0.5} \times 3.14 \times n_2 \times l_2$ wherein:
  $r_2$ represents the radius (m) of each column-shaped guide;
  $V_2$ represents the volume (m³) of the liquid mass of the prepolymer falling along and in contact with the surface of each column-shaped guide;
  $n_2$ represents the number of the column-shaped guides; and
  $l_2$ represents the length (m) of each column-shaped guide.
  In the above formula, $r_2$ was 0.0005 m, $V_2$ was 0.055 m³, $n_2$ was 30 and $l_2$ was 8 m. The evaporation surface area of the horizontal surface of the liquid mass of polymerizer 3 in the bottom of the polymerizer 1 determined 25 hours from the start of the reaction was 0.008 m². From the above, it was found that the total evaporation surface area of the prepolymer at a point in time of 25 hours after the start of the reaction was 13.0 m². The total amount of the prepolymer fed to polymerizer 1 during the polymerization reaction between the points in time of 25 hours and 50 hours after the start of the reaction, was equal to the total amount of the aromatic polycarbonate product withdrawn from polymerizer 1 and of the phenol and the like evaporated from polymerizer 1 during the polymerization reaction between the points in time of 25 hours and 50 hours after the start of the reaction. Also, the liquid volume V and the evaporation surface area S determined 50 hours after the start of the reaction were equal to those determined 25 hours after the start of the reaction.

The value of the left side and right side of the above-mentioned formula (1) were calculated and found to be 2.27 and 1.03, respectively. The liquid volume V of the prepolymer 3 was 12% of the internal volume of polymerizer 1. The production rate Q of the produced aromatic polycarbonate was 17.8 kg/hr. The produced aromatic polycarbonate was molded into a specimen in the same manner as in Example 1. The specimen was subjected to a heat aging test. As a result, it was found that the b*-value was 3.9, and the specimen did not suffer from marked discoloration.

EXAMPLES 9 to 12

Using the same polymerizer as used in Example 8, polymerization reactions of prepolymers having different $\overline{\text{Mn}}$ values, which had been prepared by reacting bisphenol A with diphenyl carbonate in a molar ratio of 1:1.05, were individually conducted under various polymerization conditions. The liquid volume V and the total evaporation surface area S of each of the prepolymers were determined in the same manner as in Example 8. As a result, it was found that the liquid volume V and the total evaporation surface area S of each prepolymer, and the $\overline{M}n$ of aromatic polycarbonate produced (the S, V and $\overline{M}n$ were determined 50 hours after the start of the reaction) were equal to those determined 25 hours after the start of the reaction. The results are shown in Table 2.

liquid volume V of the prepolymer was 30% of the internal volume of the polymerizer. Furthermore, the production rate of the produced aromatic polycarbonate was 49.7 kg/hr.

EXAMPLES 14 to 17

Substantially the same procedures as in Example 1 were individually repeated, except that use was made of prepolymers having $\overline{M}n$ of 7,000, which had been prepared by

TABLE 2

| Example Nos | Prepolymer $\overline{M}n$ | feed rate (kg/hr) | Temperature (°C.) | Pressure (Pa) | Aromatic polycarbonate product (after 50 hrs) $\overline{M}n$ | b*-value | Total evaporation surface area [S] (m²) | Liquid volume of prepolymer [V] (m³) | Formula (1) left side | Formula (1) right side | Liquid volume of prepolymer internal volume of polymerizer (%) | Production rate [Q] of produced aromatic polycarbonate (kg/hr) |
|---|---|---|---|---|---|---|---|---|---|---|---|---|
| Example 9  | 1800 | 40 | 245 | 267 | 5300  | 3.3 | 9.0  | 0.04 | 2.35 | 0.91 | 7  | 37.9 |
| Example 10 | 4400 | 30 | 250 | 120 | 8300  | 3.3 | 12.0 | 0.06 | 2.30 | 0.97 | 11 | 29.6 |
| Example 11 | 6100 | 20 | 280 | 53  | 16500 | 3.5 | 23.0 | 0.18 | 2.10 | 1.13 | 30 | 19.7 |
| Example 12 | 5700 | 10 | 260 | 93  | 10800 | 3.4 | 11.0 | 0.04 | 2.43 | 1.02 | 7  | 9.9  |

EXAMPLE 13

A polymerization reaction was carried out in substantially the same manner as in Example 1, except that use was made of a prepolymer having an $\overline{M}n$ of 7,000, which had been prepared by reacting, in place of bisphenol A, 1,1-bis(4-hydroxyphenyl)-3,3,5-trimethylcyclohexane with diphenyl carbonate. Each of aromatic polycarbonate products withdrawn from outlet 10 after 25 hours and 50 hours from the start of the polymerization reaction had an $\overline{M}n$ of 11,000. Both of the aromatic polycarbonate products were colorless, transparent (b*-value: 3.4) and contained no impurities and thermal decomposition products. The liquid volume V (m³) and the total evaporation surface area S, which were determined at each point in time of 25 hours and 50 hours from the start of the reaction in the same manner as Example 1, were 0.17 m³ and 7.5 m², respectively. The values of the left side and right side of the above-mentioned formula (1) were calculated and found to be 1.64 and 1.00, respectively. The reacting, in place of bisphenol A, a mixture of bisphenol A and one compound selected from various types of aromatic dihydroxy compounds other than bisphenol A, with diphenyl carbonate. In each of these Examples, the molar ratio of bisphenol A to the aromatic dihydroxy compound was 1:1, and the total molar amount of the mixture of bisphenol A and the aromatic dihydroxy compound was equivalent to the molar amount of bisphenol A used in Example 1. The liquid volume V and total evaporation surface area S of the prepolymer were determined in the same manner as described in Example 1. In each of these Examples, the liquid volume V, total evaporation surface area S and $\overline{M}n$ value of the aromatic polycarbonate product determined 50 hours after the start of the reaction were equal to those determined 25 hours after the start of the reaction. Results are shown in Table 3.

TABLE 3

| Example Nos. | Aromatic dihydroxy compound other than bisphenol A | Aromatic polycarbonate product (after 50 hrs) $\overline{M}n$ | b*-value | Total evaporation surface area [S] (m²) | Liquid volume of prepolymer [V] (m³) | Formula (1) left side | Formula (1) right side | Liquid volume of prepolymer internal volume of polymerizer (%) | Production rate [Q] of produced aromatic polycarbonate (kg/hr) |
|---|---|---|---|---|---|---|---|---|---|
| Example 14 | HO—⟨C₆H₄⟩—S—⟨C₆H₄⟩—OH | 10700 | 3.5 | 7.5 | 0.14 | 1.73 | 0.81 | 25 | 49.7 |

TABLE 3-continued

| Example Nos. | Aromatic dihydroxy compound other than bisphenol A | Aromatic polycarbonate product (after 50 hrs) $\overline{Mn}$ | b*-value | Total evaporation surface area [S] ($m^2$) | Liquid volume of prepolymer [V] ($m^3$) | Formula (1) left side | Formula (1) right side | Liquid volume of prepolymer internal volume of polymerizer (%) | Production rate [Q] of produced aromatic polycarbonate (kg/hr) |
|---|---|---|---|---|---|---|---|---|---|
| Example 15 | HO—⟨C6H4⟩—SO2—⟨C6H4⟩—OH | 11700 | 3.4 | 7.5 | 0.15 | 1.70 | 1.03 | 26 | 49.6 |
| Example 16 | HO—⟨3,3'-dimethyl⟩—C(=O)—⟨⟩—OH (with CH3 groups) | 11200 | 3.4 | 7.5 | 0.15 | 1.70 | 1.02 | 26 | 49.6 |
| Example 17 | HO—⟨3,3'-dimethyl⟩—CH2—⟨⟩—OH (with CH3 groups) | 11800 | 3.4 | 7.5 | 0.15 | 1.70 | 1.03 | 26 | 49.6 |

EXAMPLE 18

A polymerization reaction was carried out using a cylindrical polymerizer as shown in FIG. 4(a). The internal volume of polymerizer 1 is 0.28 $m^3$. Polymerizer 1 is equipped with 50 column-shaped guides 7A made of stainless steel SUS316L, each having a diameter of 2 mm and a length of 4 m. Polymerizer 1 is also equipped with distributing plate 6, through which prepolymer 3 fed to the polymerizer 1 can be distributed to column-shaped guides 7A so that the distributed prepolymer 3 can be caused to uniformly fall along and in contact with the surface of the guides. Outlet 10 is connected to inlet 5 for prepolymer by a circulation line so that the prepolymer falling down to the bottom of polymerizer 1 can be returned to inlet 5 through the circulation line. Polymerizer 1 has no agitating means for the prepolymer.

0.03 $m^3$ of prepolymer 3 having an $\overline{Mn}$ of 4,700, which had been prepared by reacting bisphenol A with diphenyl carbonate in a molecular ratio 1:1.05, was charged in polymerizer 1 through inlet 5, so that a polymerization reaction of prepolymer 3 was carried out in a batchwise manner for 2 hours, under polymerization reaction conditions wherein the reaction temperature was 280° C., the reaction pressure was 53 Pa (0.4 mmHg) and the circulation rate was 25 liters/hr. The produced aromatic polycarbonate had an $\overline{Mn}$ of 8,100, and was colorless, transparent (b*-value: 3.3) and contained no impurities and thermal decomposition products. After the 2-hour polymerization reaction, the liquid volume V of the prepolymer, which was present on the surface of the column-shaped guides and in the bottom portion of the polymerizer, was calculated by subtracting the volume of the prepolymer, present in the circulation line and the like, and the volume of phenol and the like evaporated off from the polymerizer, from the volume of prepolymer 3 initially charged in the polymerizer, and was found to be 0.028 $m^3$. The total evaporation surface area S, determined in the same manner as described in Example 1, was 1.8 $m^2$. The left side and right side of the above-mentioned formula (1) were calculated and found to be 1.81 and 0.96, respectively. The liquid volume V of the prepolymer was 10% of the internal volume of the polymerizer. The production rate Q of the produced aromatic polycarbonate was 16.3 kg/hr.

Comparative Example 4

Substantially the same procedure for a batchwise polymerization reaction as in Example 18 was repeated, except that use was made of column-shaped guides 7A having a diameter of 0.1 mm. The aromatic polycarbonate product, obtained 2 hours after the start of the reaction, had an $\overline{Mn}$ of 5,500. The liquid volume V and total evaporation surface area S of the prepolymer, each determined 2 hours after the start of the reaction in the same manner as described in Example 18, were 0.028 $m^3$ and 0.22 $m^2$, respectively. The left side and right side of the above-mentioned formula (1) were calculated and found to be 0.90 and 0.91, respectively.

INDUSTRIAL APPLICABILITY

According to the method of the present invention, not only can a high quality aromatic polycarbonate having high heat resistance be obtained at high polymerization rate without suffering problems (such as discoloration, entry of impurities and generation of a thermal decomposition product) which are likely to be encountered in the production by a conventional method, but also a very large motive power for agitation is not needed and a scale-up of the polycarbonate production is easy. Therefore, the method of the present invention is commercially advantageous.

We claim:

1. In a method for producing an aromatic polycarbonate which comprises subjecting to a transesterification reaction in a polymerizer at least one polymerizable material selected from the group consisting of:

a molten monomer mixture of an aromatic dihydroxy compound and a diaryl carbonate, and a molten prepolymer obtained by a process comprising reacting an aromatic dihydroxy compound with a diaryl carbonate, wherein said polymerizable material is present in the form of a liquid mass in the polymerizer and wherein said liquid mass of polymerizable material being transesterified in said polymerizer has an exposed surface, the improvement in which said transesterification reaction of said liquid mass of polymerizable material is performed under reaction conditions such that the following formula (1) is satisfied:

$$\log (S/V) \geq 2 \times 10^{-5} \times \overline{M}n + 0.8 \quad (1)$$

wherein:

S represents an evaporation surface area ($m^2$) which is defined as the area ($m^2$) of said exposed surface of the liquid mass of polymerizable material;

V represents the volume ($m^3$) of said liquid mass of polymerizable material in said polymerizer; and $\overline{M}n$ represents the number average molecular weight of the aromatic polycarbonate to be produced.

2. The method according to claim 1, wherein said transesterification reaction of the liquid mass of polymerizable material is performed in a wetting fall mode such that said liquid mass of polymerizable material is caused to fall along and in contact with a surface of a solid object selected from the group consisting of an inner wall of said polymerizer and a guide provided in said polymerizer.

3. The method according to claim 1 or 2, wherein said volume V ($m^3$) of the liquid mass of polymerizable material is 5% or more, based on the internal volume of said polymerizer.

4. The method according to claim 1 or 2, wherein said evaporation surface area S ($m^2$) of the liquid mass of polymerizable material satisfies the following formula (2):

$$S \geq 0.03Q \quad (2)$$

wherein Q represents the rate (kg/hr) at which the aromatic polycarbonate is produced.

5. The method according to claim 4, wherein said rate Q (kg/hr) at which the aromatic polycarbonate is produced is 1 kg/hr or more.

* * * * *